United States Patent Office 2,937,456
Patented May 24, 1960

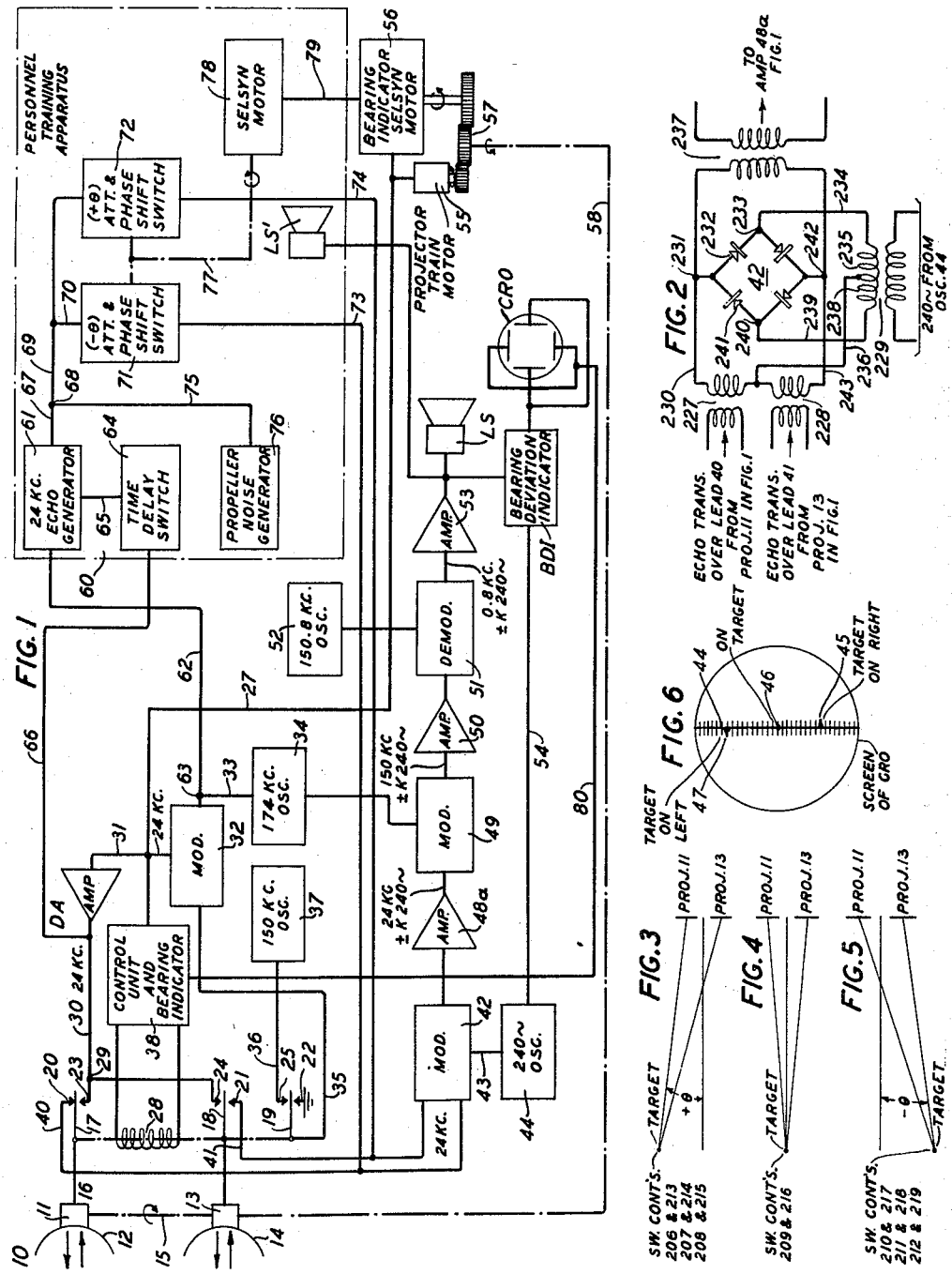

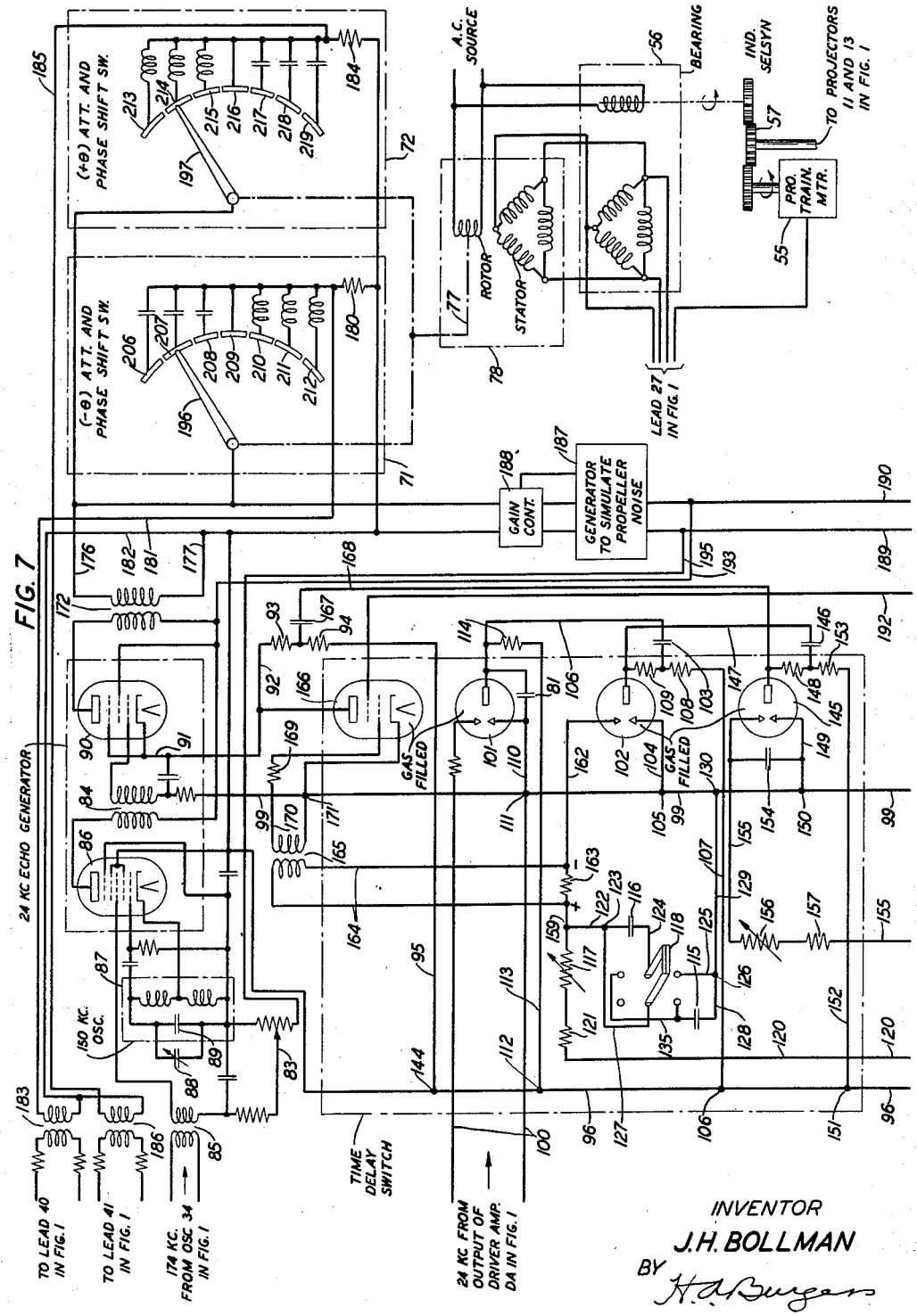

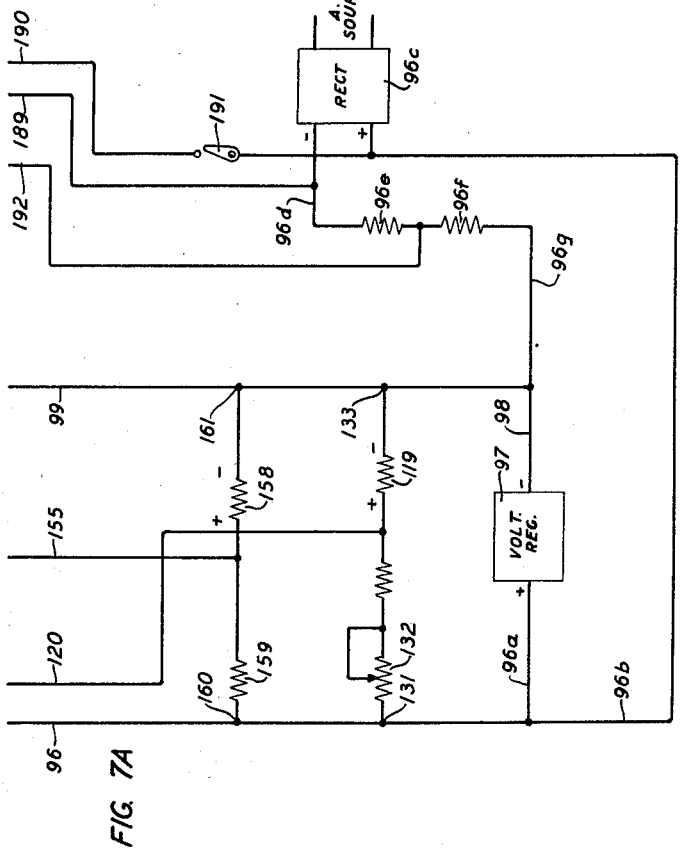
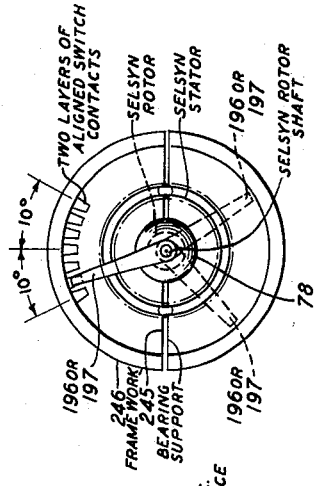
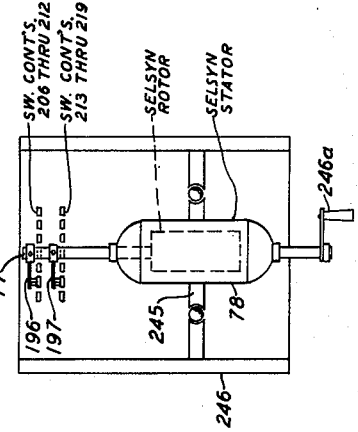
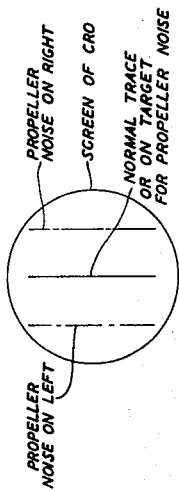

2,937,456
RADAR PRACTICE APPARATUS FOR TRAINING PERSONNEL

John H. Bollman, Rutherford, N.J., assignor to Bell Telephone Laboratories, Incorporated, New York, N.Y., a corporation of New York Filed Feb. 3, 1944, Ser. No. 520,875

14 Claims. (Cl. 35—10.4)

This invention relates to a system for locating objects by means of echoes and/or noise of certain characteristics produced thereby, and particularly to apparatus for training personnel in the operation of such a system by simulating echoes and/or noise of the certain characteristics and utilizing such echoes and/or noise in the system for the purpose of ascertaining both the distance to and direction of objects simulated by the simulated echoes and/or characteristic noise.

An echo ranging system arranged to transmit signal impulses from a certain point and to receive thereat their echoes reflected from objects in the path of the signal impulses is known as well as apparatus for measuring the time delay between the transmission of the signal impulses and the reception of their echoes and the differences in the phase of the received echoes. The measured time delay and phase difference are utilized to ascertain both the distance to the target and its right or left direction, respectively, with reference to the certain point. This system is also arranged to utilize differences in the phase of noise of certain characteristics picked up, for example, from a ship's propellers for ascertaining the right or left direction only of such ship with reference to the point at which the noise was picked up. The known echo ranging system has a range extending approximately up to 10,000 yards. Heretofore, in training personnel in the use of such system, it has been customary to produce echoes effective over the full range. This involved the expense and inconvenience of conveying personnel in ships to sea locations, and utilizing for training periods time which could be advantageously used in the location of actual targets for war purposes, for example. The present invention is particularly concerned with the training of personnel in the operation of echo ranging systems while the ship is in port or at sea.

In one type of known echo ranging system, a control unit and a bearing indicator serve to condition a pair of projectors so that a signal impulse may be imparted to the transmission medium and so that its echo, reflected by a target, may be picked up by the same pair of projectors. Each of the two projectors has a common transmitting and receiving face, and both projectors are arranged to be rotated in unison so that their faces may be disposed in the direction of the target, and therefore in the direction from which the echo will be received. When the projectors are so disposed that the target lies along a line normal to the plane of both projector faces at a point equidistant from the centers of both thereof, then the echo received by both projectors will have substantially no difference in phase. However, when the target lies to the right or left of such normal line, the phase of the echo received by one projector will lead or lag the phase of the echo received by the other projector, depending on whether the target lies to the right or left with reference to the normal line. The time delay between the transmission of the signal and the reception of its echo, and the phase difference between the echoes in the two projectors are utilized in a measuring circuit for indicating on an oscilloscope screen (1) the distance in yards to the target, and (2) the right or left direction of the target, respectively.

The present invention contemplates apparatus for simulating echoes and/or propeller noise and for supplying such echoes and/or noise to the echo ranging system for locating the target and/or noise generator simulated by the simulated echoes and/or noise.

The main object of the invention is to provide an arrangement for expeditiously training personnel in the operation of echo ranging systems.

Another object is to simulate the echoes and/or noise waves utilized in echo ranging systems for object locating purposes.

In a specific embodiment, the present invention comprises a system for training personnel in the operation of an echo ranging system of the above-described type, which system includes apparatus for simulating echoes reflected from distant targets, such, for example, as an enemy ship, and for simulating characteristic sounds produced by a source such, for example, as the propellers of a ship. This personnel training system comprises, in addition to the known type of echo ranging system described above, apparatus including a wave generator controlled by a train of gaseous discharge tubes for producing a wave whose frequency is substantially the same as that of the signal impulse transmitted by the echo ranging system. In response to such signal, the gas tubes serve to commence and terminate the transmission of the wave under control of time-constant arrangements. One time-constant arrangement commences the transmission of the wave a preselected time delay after the transmission of the signal impulse for representing a known preselected range. Another time-constant arrangement terminates the transmission of such wave after a preselected time interval depending on the known preselected range. Thus, this device produces a wave which, from the standpoints of (a) time delay and (b) duration, simulates an echo produced by a target simulated at the known preselected range.

The simulated echo is next supplied to an attenuating and phase shift mechanism wherein it is divided into two portions each of which is attenuated depending on the known preselected range and between which is established a known preselected phase difference depending on whether it is desired to simulate (c) a target lying to the right of the normal line to the faces of the two projectors embodied in the echo ranging system described above, (d) a target lying along such normal line, or (e) a target lying to the left of such normal line. Thereafter, these two wave portions are supplied to the measuring circuit embodied in the echo ranging system above described for providing in the usual manner on the oscilloscope screen (f) the distance in yards to the simulated target, and (g) the right or left direction of the simulated target.

A feature of the invention concerns the attenuating and phase shift mechanism which is not rendered effective until the two projector faces have been trained to that position at which normal echoes would be picked up with attenuation and phase characteristics substantially equivalent to the attenuation and phase characteristics of the simulated echoes. Another feature involves monitoring by an instructor via a loudspeaker which is operatively connected to the measuring circuit of the above-described echo ranging system. The output of such loudspeaker indicates to the instructor the position of the sound projector with reference to the simulated target at a given instant. In this connection, for example, the absence of sound from the loudspeaker indicates the sound projectors are trained "off" the target; the increasing of the level of the sound emitted by the loudspeaker indicates the sound projectors are being trained in a direction toward the simulated target; the decreasing of the level of the sound emitted by the loudspeaker indicates the sound projectors are being trained in a direction away from the simulated target; and the maximum level of the sound emitted by the loudspeaker indicates the sound projectors are being trained in a direction which is directly "on" the simulated target. A further feature relates to monitoring by an instructor by means of observations of the position of the moving contact arm embodied in the attenuating and phase shift mechanism. As this arm engages contacts distributed through an arc approximately of 20 degrees, the movements of the arm will readily indicate whether the sound projectors are being trained in the direction toward the simulated target, away from the simulated target, or substantially on the simulated target.

Still another feature involves the production of noise to simulate the noise generated by a source such, for example, as a ship's propellers. This noise is supplied through the attenuating and phase shift mechanism to the measuring circuit of the echo ranging system above mentioned for providing on the oscilloscope screen an indication of the right or left direction of the simulated propellers. Still other features concern the intermittent transmission of the simulated echoes and propeller noise at the same time, or at different times, for obtaining intermittent indications of "contact" with an enemy ship thereby simulating the maneuvers of a "dodging" enemy ship; or the interruptions of the transmission of the simulated propeller noise for extended time intervals for simulating "lost" contact with a submarine lying, for example, in proximity of the bottom of the body of water.

The invention will be readily understood from the following description taken together with the accompanying drawing in which:

Fig. 1 is a single line schematic circuit illustrating in box form an echo ranging system adapted with a specific embodiment of the invention;

Fig. 2 is a schematic circuit showing the type of modulator employed in Fig. 1;

Figs. 3, 4 and 5 are diagrammatic illustrations of the sound projector "off" target to the right, "on" target, and "off" target to the left, respectively;

Fig. 6 represents indications on the oscilloscope screen embodied in the echo ranging system of Fig. 1 of the "off" and "on" target conditions illustrated in Figs. 3, 4 and 5;

Figs. 7 and 7A comprise a schematic circuit illustration of the specific embodiment of the invention included in Fig. 1;

Fig. 8 is an elevational view showing the relative disposition of the contacts embodied in the attenuation and phase shift switches utilized in the invention illustrated in Figs. 1 and 7; and the movable arms for engaging such contacts, together with an arrangement for initially adjusting the movable arms relative to such switch contacts, and subsequently for effecting successive engagements with individual switch contacts;

Fig. 9 is a plan view of Fig. 8; and

Fig. 10 represents the indications on the oscilloscope screen embodied in the echo ranging system of Fig. 1 of the "on," "right," or "left" directions of a ship generating propeller noise.

The same reference numerals serve to identify the same elements appearing in the several figures of the drawing.

Referring to Fig. 1, sound translating apparatus 10 comprises a projector 11 having a face 12 for transmitting and receiving sound waves, and a projector 13 having a face 14 for transmitting and receiving sound waves. These projectors are coupled by a mechanical connection 15 which serves to drive them in unison in clockwise and counter-clockwise directions in searching for a target in a manner that will be hereinafter pointed out.

An electromagnetic relay 16 comprises armatures 17, 18 and 19 associated with break contacts 20, 21 and 22, respectively, and with make contacts 23, 24 and 25, respectively. The make contacts 23 and 24 are joined in parallel to a common point 29 which is connected by a lead 30 to the output of a driver amplifier DA whose input is connected by lead 31 to the output of a modulator 32. This modulator has its input connected directly by lead 33 to oscillator 34, and through lead 35, armature 19, make contact 25, and lead 36 to oscillator 37. The relay 16 is operated by a winding 28 which may be energized and deenergized under the influence of a control unit and bearing indicator 38 whose function will be hereinafter explained.

The break contacts 20 and 21 are connected over leads 40 and 41, respectively, to the input of modulator 42 which input is also connected over lead 43 to oscillator 44. The output of modulator 42 is supplied through amplifier 48a to the input of modulator 49 whose input is also connected to the oscillator 34. The output of modulator 49 is supplied through amplifier 50, which has a fixed tuning and gain, to the input of demodulator 51 whose input is also connected to oscillator 52. The output of this demodulator is supplied through amplifier 53 to a loudspeaker LS, and to the input of bearing deviation indicator BDI which input is also connected over lead 54 to the oscillator 44. The output of the bearing deviation indicator is connected to the horizontal deflecting plates of a cathode ray oscilloscope CRO which has its vertical deflecting plates connected to the control unit and bearing indicator so as to be synchronized with the transmission of the signal impulse in a manner that will be hereinafter pointed out.

The control unit and bearing indicator is also connected by an electrical circuit 27 to lead 31 and to an electric motor 55 and bearing indicator selsyn motor 56. A gear train 57 provides a mechanical connection between the motors 55 and 56. This gear train serves to actuate a suitable mechanical connection 58 extending therefrom to the projectors 11 and 13, and thereby to drive these projectors in clockwise and counter-clockwise directions, under the influence of the control unit and bearing indicator, in searching for a target.

In the operation of the above-described portion of Fig. 1, the control unit and bearing indicator is so actuated as to energize the operating winding 28 whereby the armatures 17, 18 and 19 are actuated to make contacts 23, 24 and 25, respectively. This conditions the moduator 32 so that the 150-kilocycle wave of oscillator 37 through the make contact 25 and the 174-kilocycle wave of oscillator 34 are supplied to the input of the modulator 32. From the output of this modulator, a 24-kilocycle impulse signal wave is formed with high power in the amplifier DA and thereafter is impressed through the make contacts 23 and 24 on the projectors 11 and 13 which impart this signal impulse into the transmission medium. The time duration of this signal impulse is determined by the setting of the range unit, not shown, in the control unit and bearing indicator. After a certain time interval, the operating winding 28 is deenergized to return the relay 16 to the unoperated condition.

Assuming this impulse wave causes a 24-kilocycle echo from a target, such echo is eventually picked up by the projectors 11 and 13, passed through break contacts 20 and 21, and transmitted over leads 40 and 41, respectively, to the input of the modulator 42 to which input is also supplied a portion of a 240-cycle wave from the oscillator 44. Referring to Fig. 2, the 24-kilocycle echo received from the projector 11 and transmitted over the lead 40, Fig. 1, is applied through transformer 227 to the vertical diagonal of the modulator 42, which is composed of a plurality of copper-oxide elements arranged in bridge form; the echo received from the projector 13 and transmitted over the lead 41 is applied through transformer 228 to the vertical diagonal of the modulator 42; and the portion of the 240-cycle wave received from the oscillator 44 via lead 43, Fig. 1, is applied through transformer 229 to the horizontal diagonal of the modulator 42. During the positive half cycle of the 240-cycle wave, the 24-kilocycle echo from projector 11 flows in a circuit including the upper end of the secondary winding of transformer 227, lead 230, bridge terminal 231, bridge arm 232, bridge terminal 233, lead 234, portion 235 of the secondary winding of transformer 229, lead 236 and the lower terminal of the secondary winding of the transformer 227; and is thereby short-circuited through the modulator 42, and does not reach the output transformer 237, Fig. 2, or amplifier 48a, in Fig. 1.

During the same positive half-cycle of the 240-cycle wave, the 24-kilocycle echo from projector 13 flows in a circuit comprising the upper terminal of the secondary winding of transformer 228, lead 236, portion 238 of the secondary winding of transformer 229, lead 239, bridge terminal 240, bridge arm 241, bridge terminal 231, primary winding of output transformer 237, bridge terminal 242, and lead 243 to the lower terminal of the secondary winding of transformer 46; and is thereby supplied through the transformer 237 to the input of amplifier 48a, Fig. 1. During the negative half-cycle of the 240-cycle wave, the opposite effect takes place, that is, the 24-kilocycle echo from projector 11 is supplied through the transformer 237 to the amplifier 48a, Fig. 1, while the 24-kilocycle echo from the projector 13 is short-circuited by the copper-oxide bridge 42. Thus, the 240-cycle wave effectively switches from projector 11 to projector 13, and vice versa, such that the echo from only one projector is effectively transmitted to the amplifier 48a, Fig. 1, at a given instant.

Referring to Figs. 3, 4 and 5, it will be seen that the phase relation between the echo received by the projectors 11 and 13 depends on the location of the target with reference to a line normal to the plane of the faces of the projectors at a point positioned equidistantly from the centers of both projector faces 12 and 14 in Fig. 1. In Fig. 4, the target lies on the normal line, and therefore the difference in phase between the echo received by both projectors is substantially zero. In Fig. 3, the target lies to the right of the normal line, and therefore the phase of the 24-kilocycle echo received by projector 11 leads the phase of the 24-kilocycle echo received by the projector 13. In Fig. 5, the target lies to the left of the normal line, and therefore the phase of the 24-kilocycle echo received by the projector 11 lags the phase of the 24-kilocycle echo received by the projector 13. Hence, the angle $(+)\theta$ may be assumed to indicate the condition when the target is on the right with reference to the normal line of the projectors, and the angle $(-)\theta$ to indicate the condition when the target is on left with reference to the normal line of the projectors.

Thus, the 24-kilocycle echo transmitted over both lines 40 and 41 from the respective projectors is modulated with the 240-cycle wave. This means that the 24-kilocycle modulation components supplied to the amplifier 48a from the output of the modulator 42 have a phase difference therebetween depending on the sign and magnitude of the angle $\theta$. Also, this means that the 240-cycle modulation components are supplied to the input of the amplifier 48a. The effective sign of the 240-cycle component will depend on the sign of the angle $\theta$; and the effective magnitude of the 240-cycle component will be proportional to the magnitude of the angle $\theta$. Thus, the effective modulation components in the output of the modulator 42 will include 24-kilocycle components, and $\pm K$ 240-cycle components, where K is the factor of proportionality depending on the magnitude of the angle $\theta$, and the sign of the 240-cycle components depends on the sign of the angle $\theta$ as above mentioned.

From the output of the amplifier 48a, the 24-kilocycle and 240-cycle components are supplied to the input of the modulator 49 together with a portion of the 174-kilocycle wave from the oscillator 34. In the output of this modulator, the modulation components include a 150-kilocycle component together with the $\pm K$ 240-cycle components. These components are supplied to the input of demodulator 51, together with a 150.8-kilocycle wave from the oscillator 52. In the output of this demodulator, the components include an 800-cycle component, and the $\pm K$ 240-cycle components. After amplification one portion of these components is supplied to the loudspeaker LS so that the audible signal component will indicate to an operator that the target, giving rise to the echo, is within the range for which the control unit and bearing indicator has been set as previously mentioned.

At the same time, another portion of the amplified 800-cycle and $\pm K$ 240-cycle components is supplied to the bearing deviation indicator BDI. This indicator serves to compare the phase relation between the 240-cycle component and the 240-cycle wave supplied by the oscillator 44, and to produce a direct current component which is proportional to such phase relation as disclosed in my co-pending application, Serial No. 483,126 filed April 15, 1943, now Patent No. 2,418,156. This direct current component applied to the horizontal deflecting plates of the cathode ray oscilloscope serves to indicate the location of the target relative to the normal line of the projectors 11 and 13 as illustrated in Fig. 6.

Referring to Fig. 6 which shows the screen of the oscilloscope, the vertical line 44 is calibrated in yards to indicate the distance to the target giving rise to the two 24-kilocycle echoes whose phase difference is being measured in the manner above mentioned. For this purpose the vertical deflecting plates are connected via lead 80 to the control unit and bearing indicator. The sending out of the signal pulse under the influence of the control unit and bearing indicator as above explained causes an illuminated column to start to rise along the vertical line 44 on the oscilloscope screen such that when the spurt of the direct current component is applied to the horizontal deflecting plates of the oscilloscope, the uppermost portion of such illuminated column will be caused to assume one of the following three positions. The position of the horizontal pip 45, Fig. 6, will indicate the sign of angle $\theta$ is plus as shown in Fig. 3, and the target is "off" the projectors to the right at a distance which is proportional to the length of the pip 45 for a predetermined maximum angle. The position of the point 46, Fig. 6, will indicate the target is directly "on" the projectors as shown in Fig. 4. The position of the horizontal pip 47, Fig. 6, will indicate the target is "off" the projectors to the left as represented in Fig. 5 at a distance which is proportional to the length of the pip 47 for a predetermined maximum angle. The points on the vertical scale 44 corresponding to respective points 45, 46 and 47 will indicate the distance in yards to the target. The vertical scale in Fig. 6 is for 1,000 yards, and may be extended to 10,000 yards by use of a multiplier in the familiar manner.

In the foregoing arrangement, the control unit and bearing indicator may be conditioned to withhold the sending out of the signal pulses while during such time the projectors are trained in search of noise sources such, for example, as a ship's propellers. When such noise is picked up, the center indication, Fig. 10, shows such noise source lying directly "on" the projectors; the movement of the right-hand indication shows such noise source lying "off" to the right of the projectors at a distance which is proportional to the magnitude of such movement for a predetermined maximum angle; and the movement of the left-hand indication shows such noise source lying "off" to the left of the projectors in a similar manner, In accordance with the present invention, personnel training apparatus 60 is connected permanently to the echo ranging circuit hereinabove described with reference to Fig. 1, but is located at a point removed from the position of the operator for the echo ranging circuit. This apparatus as shown in Fig. 1 comprises a generator 61 for producing an alternating wave having a frequency, in one example, of 24 kilocycles. This generator has one connection via lead 62 to a point 63 embodied in the lead 33 extending between the modulator 32 and oscillator 34, and another connection via a lead 65 to a time delay switch 64 whereby such 24-kilocycle wave is formed with a preselected amount of time delay, with reference to the transmission of the signal impulse by the echo ranging circuit, in a manner that will be subsequently explained. This time delay switch is also connected by lead 66 to the output of the driver amplifier DA. The 24-kilocycle wave generator has a further connection via lead 67, point 68, leads 69 and 70 to (—)θ phase shift switch 71 and (+)θ phase shift 72, which two switches are individually connected by leads 73 and 74, respectively, to the projector leads 40 and 41. Joined to the point 68, and thereby to both phase shift switches is a lead 75 connected to a propeller noise generator 76. A mechanical connection 77 extends between both phase shift switches and a selsyn motor 78 which is also connected by lead 79 to the bearing indicator selsyn motor 56. A loudspeaker LS' connected to the output of amplifier 53 in parallel with loudspeaker LS, Fig. 1, serves to monitor the operator of the echo ranging circuit in a manner that will be subsequently explained.

Referring to Fig. 7, transformer 85 serves to apply one portion of the 174-kilocycle output of the oscillator 34, Fig. 1, through a potentiometer 83 to the input of a modulator tube 86 to which input is also supplied a 150-kilocycle wave from oscillator 87. The potentiometer serves to adjust the gain of this modulator. A variable capacitor 88 connected in parallel with capacitor 89 of the oscillator 87 serves to adjust the effective frequency of this oscillator to simulate Doppler effects in the modulation components in the output of the modulator 86. From the output of the oscillator tube 86, a transformer 84 impresses a 24-kilocycle modulation component on the input of amplifier tube 90 which operates as a switch to transmit impulses of the 24-kilocycle component and which is normally biased to cut-off by a voltage supplied in a circuit comprising cathode of tube 90, leads 91 and 92, series resistors 93 and 94, lead 95, point 144, leads 96 and 96a, (+) and (—) terminals of voltage regulator 97, leads 98 and 99, Fig. 7A, and the control grid of the switching amplifier 90. This voltage regulator is connected from its (+) terminal by leads 96a and 96b to the positive terminal of a rectifier 96c whose (—) terminal is connected by lead 96d, series resistors 96e and 96f, and leads 96g and 98 to the (—) terminal of the voltage regulator 97, Fig. 7A. This rectifier is connected to a suitable A.C. source, not shown. The unblocking and blocking of the switching amplifier 90 for respectively commencing and terminating the transmission of the impulses of 24 kilocycles will now be explained.

From the output of the driver amplifier DA, Fig. 1, a portion of the 24-kilocycle signal wave is supplied over a pair of leads 100, 100 to two cathodes of cold cathode gas tube 101 (which is normally deionized) to institute ionization therein in a circuit comprising its lower cathode, lead 110, point 111 in lead 99, lead 99, voltage regulator 97, lead 96, point 112 in lead 96, lead 113, resistor 114, and the anode of gas tube 101. The charge on capacitor 81 serves to continue such ionization to accomplish a purpose which will presently appear, and is supplied in a circuit including resistor 114, lead 113, point 112 in lead 96, and leads 96 and 96a to the (+) terminal of the voltage regulator 97. Cold cathode gas tube 102 is normally ionized to cause a current flow in a circuit including its lower cathode, lead 104, point 105 in lead 99, lead 99, voltage regulator 97, lead 96, point 106 in lead 96, lead 107, series resistors 108 and 109, and the cathode of gas tube 102. This ionization is caused by the positive charge on capacitors 115 and 116 obtained in a manner that will now be described.

A lead 162 connects the upper cathode of gas tube 102 through resistor 163, point 159, lead 122 to a further point 123. Assuming DPDT switch 118 is thrown to its lower position, the point 123 is connected through one circuit including capacitor 116, lead 124, right-hand leg of the switch, lead 125 to point 126; and at the same time, the point 123 is connected through another circuit including lead 127, left-hand leg of the switch, capacitor 115, and lead 128 to the point 126. Between the points 123 and 126, the capacitors 115 and 116 are now effectively connected in parallel. Assuming the switch 118 is thrown to its upper position, the point 123 is connected through a circuit including capacitor 116, lead 124, right-hand leg of the switch, lead 135, capacitor 115, and lead 128 to the point 126. Between the points 123 and 126 the capacitors 115 and 116 are now effectively connected in series. The point 126 is connected by lead 129, point 130 in lead 99, lead 99, point 105 in lead 99, and lead 104 to the lower cathode of the gas tube 102. From the foregoing, it is apparent the capacitors 115 and 116 may be connected either in parallel or series across the cathodes of the gas tube 102.

The charge may be supplied to the capacitors 115 and 116 in a series circuit including point 123, lead 122, point 159, variable resistor 117, fixed resistor 121, lead 120, (+) and (—) terminals of resistor 119, point 133 in lead 99, lead 99, point 130 in lead 99, and lead 129 to point 126. The parallel or series connection of capacitors 115 and 116 together with the variable resistor 117 provide a time constant for instituting ionization in the gas tube 102 for a purpose that will be explained later. Once ionization has been instituted in the gas tube 102, it can be maintained by the positive charge on capacitor 103 which charge is obtained in a circuit including left-hand terminal of capacitor 103 (its right-hand terminal being connected by lead 106 to the anode of deionized gas tube 101), resistor 108, lead 107, point 106 in lead 96, leads 96 and 96a to the (+) terminal of voltage regulator 97. The gas tube 102 is returned to the de-ionized condition when the gas tube 101 becomes ionized to provide a discharge path therethrough as above traced for the charge on capacitor 103, and thereby a reduction of the effective positive voltage applied to the anode of gas tube 102 to terminate ionization therein.

Across the cathodes of the gas tube 145 is a capacitor 154 which has one terminal connected to a lead 155 connected to the upper cathode of this tube, variable resistor 156 and fixed resistor 157 in series, lead 155, (+) and (—) terminals of resistor 158, point 161 in lead 99, lead 99, point 150 in lead 99, and lead 149 connecting the other terminal of the capacitor 154 and the lower cathode of the gas tube 145. The resistor 158 is connected across the voltage regulator 97 in a series circuit comprising (+) terminal of resistor 158, resistor 159, point 160 of lead 96, leads 96 and 96a, voltage regulator 97, leads 98 and 99, point 161 in lead 99, and thence to the (—) terminal of the resistor 158. The charge on capacitor 154 through variable resistor 156 provides a time constant for instituting ionization of the gas tube 145 for a purpose that will be hereinafter explained. Once the gas tube 145 is ionized, the ionized condition is sustained by the positive charge on capacitor 146 which obtains its charge in a circuit including its left-hand terminal (its right-hand terminal being connected to the anode of the deionized tube 102), resistor 153, lead 152, point 151 in lead 96, lead 96 to the (+) terminal of the voltage regulator 97. The gas tube 145 is returned to the deionized condition when the gas tube 102 becomes ionized to provide a discharge path therethrough for the charge on capacitor 146 and thereby a reduction of the positive voltage applied to the anode of the gas tube 145. Such voltage reduction terminates the ionization in the gas tube 145.

When ionization is instituted in gas tube 102 to cause current to flow in its discharge circuit above traced, the positive voltage effective across resistor 163 is applied over the pair of leads 164, 164 and input transformer 165 to its input of the gas tube 166 thereby to institute ionization in the latter tube in a circuit including anode-cathode circuit of tube 166, point 171 in lead 99, lead 99, voltage regulator 97, lead 96, point 144 in lead 96, lead 95, resistors 94 and 93 in series and lead 92 to the anode of the tube 166. This ionization is sustained by the positive charge on capacitor 167 which charge is obtained in a circuit including left-hand terminal of capacitor 167 (its right-hand terminal being connected by lead 168 to the anode of gas tube 145 which is in the deionized condition), resistor 94, lead 95, point 144 in lead 96 and leads 96 and 96a to the (+) terminal of the voltage regulator 97. The gas tube 166 is returned to the deionized condition when the gas tube 145 is ionized to provide a discharge path therethrough as above traced for the charge on capacitor 167, and thereby a reduction of the effective positive voltage applied to the anode of gas tube 166 to terminate ionization therein. The gas tube 166 is normally deionized or blocked by a biasing voltage applied to its control grid in a circuit including its control grid, resistor 169, lead 170, secondary winding of transformer 165, point 171 in the lead 99 and lead 99 extending to the (−) terminal of the voltage regulator 97. The positive voltage produced across resistor 163 and applied to the input of the gas tube 166 in the circuit above traced serves to overcome such biasing voltage thereby permitting the gas tube 166 to ionize. This serves to short-circuit the resistors 93 and 94, and thereby to reduce the biasing voltage applied to the control grid of the switching amplifier 90. This causes the gain of the switching amplifier 90 to increase whereby the 24-kilocycle modulation component in the output of modulator tube 86 is caused to be supplied to the output transformer 172. Ionization of gas tube 145 returns the gas tube 166 to the deionized condition to reestablish the biasing voltage on the control grid of amplifier 90 and thereby terminating the supply of 24-kilocycle modulation component to the output transformer 172.

The secondary winding of the output transformer 172 is applied over leads 176 and 177 to (−)θ phase-shifting switch 71 and (+)θ phase-shifting switch 72 in parallel. The voltage produced across resistor 180 associated with the (−)θ switch is supplied over leads 181 and 182 and transformer 183 to the lead 40 in Fig. 1. The voltage produced across resistor 184 associated with the (+)θ switch is supplied over leads 182 and 185 and transformer 186 to the lead 41 in Fig. 1.

A generator 187 of audible noise simulating propeller noise of an unseen ship, for example, embodying suitable gain control 188 is applied across the leads 176 and 177, and thereby to the (−)θ and (+)θ switches. This noise generator may be of the multivibrator type, and is energized over leads 189 and 190 extending therefrom to the rectifier 96c. An SPST switch 191 embodied in the lead 190 serves to control the effective connection of the noise generator to the (−)θ and (+)θ switches. A lead 192 joined to the mid-point of series resistors 96c and 96f supplies a negative potential to the screen of the gas tube 166. Lead 193 supplies positive voltage to the anodes of the oscillator tube 86 and switching amplifier 90. A lead 195 supplies through potentiometer 83 biasing voltage to the control grid of the oscillator tube 86 for controlling the gain thereof.

The mechanical connection 77 joins movable arms 196 and 197 of the (−)θ and (+)θ switches 71 and 72, respectively, to the rotor of the selsyn motor 78. This rotor and the rotor of the bearing indicator selsyn motor 56 are connected to a suitable alternating current source.

The stator of the bearing indicator selsyn motor 56 is connected to the control unit and bearing indicator, and for this purpose the plurality of leads shown extending from the stator of the latter motor, Fig. 7, constitute the electrical connection 27 joining the corresponding points in Fig. 1.

Referring to Figs. 1 and 7, the (−)θ switch 71 comprises a plurality of contacts 206, 207, 208, 209, 210, 211 and 212; the (+)θ switch 72 comprises a plurality of contacts 213, 214, 215, 216, 217, 218 and 219. Due to the mechanical connection 77, Figs. 7 and 8, the contact arms 196 and 197 are simultaneously moved over corresponding individual contacts in the respective groups of contacts. This means that the contacts are associated in pairs as follows: 206, 213; 207, 214; 208, 215; 209, 216; 210, 217; 211, 218; and 212, 219. Thus, when contact arm 196 of (−)θ switch 71 is on its associated contact 206, the contact arm 197 of (+)θ switch 72 is on its associated contact 213; and when contact arm 197 of (+)θ switch 72 is on its associated contact 219, the contact arm 196 of (−)θ switch 71 is on its associated contact 212; and so on for the intervening pairs of contacts.

Referring to Fig. 8, the selsyn motor 78 comprises a stator which is mounted on a suitable ball bearing support 245 extending from an annular framework 246, Figs. 8 and 9. Projecting from the lower end of the stator is a crank 246a whereby the stator may be rotated on its support 245 in clockwise and counter-clockwise directions through a desired angular distance as shown in Fig. 9 for a purpose that will presently appear. Referring again to Fig. 8, the selsyn motor 78 also embodies a rotor on the upper end of which is the mechanical connection 77, Figs. 7 and 8, adapted to carry in vertical alignment the switch arms 196 and 197. As the individual contacts of the group of switch contacts 206 through 212 are vertically aligned with corresponding individual contacts of the group of switch contacts 213 through 219 as illustrated in Figs. 8 and 9, the switch arms 196 and 197 are arranged to engage the respective contacts as the rotor is rotated, under certain conditions which will be later mentioned. As it is a characteristic of a selsyn motor that a fixed angular relation exists between its stator and rotor, crank 246a, Fig. 8, may be actuated to rotate the stator until its associated rotor has caused the switch arms 196 and 197 to disengage the individual contacts in the respective groups of contacts, and thereafter to be positioned somewhere in the remaining 340 degrees of the framework 246 but not within the 20 degrees of this framework as shown in Fig. 9. The rotor, Figs. 8 and 9, may be caused to rotate in such direction as to cause the switch arms 196 and 197 to engage the individual contacts of the respective groups of contacts 206 through 212 and 213 through 219 in a manner and for a purpose which will be presently explained.

Referring to Fig. 7, it will be noticed that the upper three individual contacts 206, 207 and 208 of (−)θ switch 71 are connected through individual capacitors to the resistor 180 while the corresponding upper three individual contacts 213, 214 and 215 of (+)θ switch 72 are connected through individual inductances to the resistor 184; the middle contacts 209 and 216 of the respective (−)θ and (+)θ switches 71 and 72 are directly connected to the resistors 180 and 184; and the lower three individual contacts 210, 211 and 212 of (−)θ switch 71 are connected through individual inductances to the resistor 180 while the corresponding lower three contacts 217, 218 and 219 of (+)θ switch 72 are connected through individual capacitors to the resistor 184. Thus, each contact is effective substantially over 3 degrees and each group of contacts over an effective range of 20 degrees.

In the operation of the personnel training apparatus according to the present invention, it will be assumed that the circuit arrangement of Fig. 1 is in an operative condition except in such respects as are hereinafter mentioned, and a student to be trained is engaged in so operating the control unit and bearing indicator as to cause the projectors 11 and 13 to transmit signal impulses into the transmission medium but such signal impulses do not serve to produce actual echoes; and further that the echoes which would normally result from such signal impulses will be simulated both as to time delay and angle $\theta$, according to the present invention, in a manner which will now be explained.

Referring to Figs. 8 and 9, the instructor initially actuates the stator by the crank 246a so as to cause the rotor to move the switch arms 196 and 197 out of engagement with the respective groups of contacts 206 through 212, and 213 through 219, to the positions, for example, shown by either of the broken lines in Fig. 9; sets the variable resistor 117, Fig. 7, on an apparent range of 5 to 10,000 yards; adjusts the variable resistor 156, Fig. 7, at a value commensurate with the apparent range; adjusts the gain control 188 of the noise generator, Fig. 7, substantially to a minimum assuming it to be in operation; adjusts the potentiometer 83, Fig. 7, so that the gain of the oscillator 86 is substantially a minimum; and prepares to monitor the student on the loud-speaker LS'. The instructor then authorizes the student to commence or continue, as the case may be, operating the echo ranging system. The student accomplishes this by operating the control unit and bearing indicator such that the bearing indicator selsyn motor 56 causes the projectors 11 and 13 to rotate in clockwise and counter-clockwise directions as desired. The position of these projectors, with reference to a given point, will be continuously shown on the bearing indicator embodied in the control unit and bearing indicator.

As the stator of the bearing indicator selsyn motor 56 is electrically connected to the stator of the selsyn motor 78, the rotor of the latter motor will be caused to rotate in directions corresponding to those of the rotor associated with the bearing indicator selsyn motor 56, and therefore in rotary directions corresponding to the rotary directions in which the projectors 11 and 13 are moved. When the student actuates the projectors 11 and 13 to the proper position, the switch arms 196 and 197 affixed to the rotor of selsyn motor 78 are caused to engage a pair of contacts depending on whether the rotor of the selsyn motor 78 was moving in a clockwise or counter-clockwise direction.

At this point, a portion of the 174-kilocycle wave from the output of oscillator 34, Figs. 1 and 7, is applied to the input of the oscillator tube 86, together with the 150-kilocycle wave from the oscillator 87. As the switching amplifier 90 is now blocked by the control grid biasing voltage previously identified, this 24-kilocycle modulation component is precluded from reaching the output transformer 172. At the same time a portion of the 24-kilocycle signal impulse from the output of driver amplifier DA, Fig. 1, is supplied over leads 100, 100, Fig. 7, to the gas tube 101 to institute ionization therein. As the gas tube 102 is ionized, the ionization of gas tube 101 provides therethrough a discharge path for the capacitor 103. Hence, the gas tube 102 is de-ionized. Now the capacitors 115 and 116 commence to charge through the range resistor 117; and depending on the time constant of this capacitor-resistor combination, ionization will again be instituted in the gas tube 102.

Ionization of the gas tube 102 causes a spurt of positive direct voltage effective across the resistor 163 to be impressed through the transformer 165 onto the input circuit of the gas tube 166. This serves to overcome substantially the effective biasing voltage (or render positive) applied to the control grid of the gas tube 166, whereby ionization is instituted in this tube. This short-circuits resistors 93 and 94, and thereby reduces the effective biasing voltage supplied to the control grid of the switching amplifier 90. As this increases the effective gain of the switching amplifier 90, the latter commences to transmit the 24-kilocycle modulation component to the output transformer 172. Ionization of the gas tube 102 also provides a discharge path therethrough for the capacitor 146, whereupon the gas tube 145 is deionized. After a period of time determined by the time constant of the capacitor 154 and resistor 156 connected to the gas tube 145, this tube is again ionized. This provides a discharge path for the capacitor 167 connected to the anode of the gas tube 166, whereupon the latter tube is de-ionized. This serves to reestablish the effective biasing voltage on the control grid of the switching amplifier 90 whereupon the transmission of the 24-kilocycle modulation component to the output transformer 172 is terminated. Thus, an impulse of 24 kilocycles is supplied to the output transformer 172. The time delay of such impulse is determined by the time constant of the capacitors 115 and 116 and resistor 117; and the time duration of such impulse is determined by the time constant of capacitor 154 and resistor 156. An electronic timing arrangement of this type is disclosed in my copending application, Serial No. 468,532, filed December 10, 1942.

The 24-kilocycle impulse effective in the output transformer 172 is next impressed onto the input circuits of the $(-)\theta$ and $(+)\theta$ switches 71 and 72 which are effectively phase shift attenuators. When the contact arms 196 and 197 are on the respective contacts 206 and 213, the effective attenuation of the 24-kilocycle lobes and the phase shift of the 24-kilocycle lobes are relatively large; and the same amount of attenuation is effectively introduced into the two 24-kilocycle lobes but the effective phase shift therebetween is in a positive direction as illustrated in Fig. 3. When the contact arms 196 and 197 are moved over the respective contact pairs 207 and 214; and 208 and 215, the effective attenuation and phase shift are decreasing. Thus, when the contact arms 196 and 197 are successively on the upper three contact pairs 206 and 213, 207 and 214, and 208 and 215, the effect introduced into the two 24-kilocycle components tends to simulate the target location indicated in Fig. 3 as hereinbefore explained; that is, the sign of angle $\theta$ is positive but this angle is progressively decreasing. When the contact arms 196 and 197 are on the middle contacts 209 and 216, the attenuation and phase shift of the two 24-kilocycle lobes are substantially a minimum as illustrated in Fig. 4. This simulates the target location indicated in Fig. 4 as explained above. When the contact arms 196 and 197 are moved successively on the lower three pairs, that is, 210 and 217, 211 and 218, and 212 and 219, the attenuation of the 24-kilocycle lobes progressively increases and the phase shift therebetween progressively increases in a negative direction. This simulates the target location indicated in Fig. 5 as previously described. These 24-kilocycle simulated echoes are transmitted through the respective transformers 183 and 186, Fig. 7, and over the respective leads 40 and 41 in Fig. 1 to the input circuit of the modulator 42. Thereafter, the simulated echoes are utilized in Fig. 1 to obtain an indication of the target location on the screen of the oscilloscope CRO as to (1) left or right of the projectors, and (2) distance in yards, as hereinbefore explained with reference to normal echoes received by the projectors 11 and 13. If the generation of the simulated echoes were discontinued by so operating the potentiometer 83 as to decrease the gain of the modulator tube 86, Fig. 7, to the proper point and the simulated propeller noise generator 187 were energized by closing the switch 191, Fig. 7, then the student could train the projectors 11 and 13 to search for the source of the simulated propeller noise in precisely the same manner as he sought the simulated echo. The simulated propeller noise, when picked up, will give indications as to directions exactly in the manner described above regarding actual ships' propellers and illustrated in Fig.

10. Referring to this figure the center indication shows the simulated ships' propellers directly "on" the projectors; the right-hand indication shows the simulated ships' propellers lying "off" to the right of the projectors; and the left-hand indication shows the simulated ships' propellers lying "off" to the left of the projectors.

Once the student obtains his first indication of the simulated target or simulated source of propeller noise by first engaging either contact pairs 206 and 213 or 212 and 219, he could then concentrate his training of the projectors 11 and 13 in this area of the bearing of the projectors 11 and 13 which bearing he is already aware of because of the continuous reading on the bearing indicator associated with the control unit and bearing indicator. When the student announces to the instructor that he is directly "on" the target, the instructor could allow the gun crew to press the "attack" by firing depth charges in the case of an underwater echo ranging system, or by firing other guns in the case of other echo ranging systems. The instructor could also permit the student to press the "attack" by adjusting the range resistor 117, Fig. 7, to decrease the apparent or preselected range of the target, while at the same time increasing the gain of the modulator tube 86 by properly actuating the potentiometer 83, Fig. 7, and/or the pair of noise generators 187 by properly actuating the gain control 188 therefor, Fig. 7. At some time during the student's activities, the instructor could decide that the enemy submarine, for example, has detected his approaching adversary, and then the instructor could discontinue the operation of the simulated propeller noise generator 187, Fig. 7 by opening the switch 191, Fig. 7. At this point, this would tend to simulate the condition where the enemy submarine was lying at the bottom of the body of water, waiting for the apparent danger to pass. During such simulated condition, the amplitudes of the simulated echo impulses should be decreased by properly actuating the potentiometer 83, Fig. 7. However, the instructor may choose to continue the operation of the source of simulated propeller noise, and simulate a "dodging" enemy submarine by continuously manipulating the crank 246 on the stator of selsyn motor 78, Figs. 7 and 8, as the student tends to cause the switch arms 196 and 197 to move over the switch contacts 206 through 212 and 213 through 219, respectively. As the "attack" closes in, the instructor may allow it to culminate by the firing of depth charges or other guns or to discontinue the simulated echoes and propeller noise to indicate lost "contact" with the enemy submarine by shutting off the attack trainer. The instructor may discontinue the student's training at this point. The firing of depth charges or other guns in the case of a simulated attack is concerned with the training of the gunnery crew associated with the sound crew. As teamwork of the highest possible order between those two crews is essential in case of a real attack, the firing of live ammunition on occasion is resorted to in order to develop such teamwork.

As the voltages for energizing the electronic tubes and charging certain capacitors embodied in the personnel training apparatus are obtained from the output of rectifier 96c in Fig. 7A, the personnel training apparatus can be rendered inoperative and thereby effectively disconnected from the sound apparatus by interrupting the alternating current supply to this rectifier. Since the leads 62, 66, 73 and 74 interconnecting the sound apparatus and personnel training apparatus, Fig. 1, are high impedance, the effectiveness of the sound apparatus in actual use on shipboard is substantially unimpaired when the personnel training apparatus is so rendered inoperative.

What is claimed is:

1. In combination with an echo ranging system comprising means for transmitting signal impulses from a certain point, means at said point for receiving corresponding echoes from objects in the signal path, and means controlled by the transmission of the signal impulses and the reception of their corresponding echoes for indicating the distances from said point to said objects, means for training personnel in the operation of said system comprising means controlled by the transmission of the signal impulses for supplying to said indicating means simulated echoes having preselected time delays, with reference to corresponding signal impulses, for representing known distances from said point to simulated objects, said indicating means being controlled by the transmission of the signal impulses and the corresponding simulated echoes for indicating the known distances.

2. In combination with an echo ranging system comprising a transreceiver for transmitting a signal impulse from a certain point and for receiving its echo thereat, and means for indicating the distance from said point to the object causing the echo as a function of the time intervening between the transmission of the signal impulse and the reception of its echo, means for training personnel in the operation of said system comprising means controlled by the transmission of the signal impulse to supply to said indicating means a simulated echo representing a known distance from said point to a simulated object for obtaining an indication of such known distance as a function of the time intervening between the transmission of the signal impulse and the supplying of the simulated echo to said indicating means.

3. In combination with an echo ranging system comprising a transreceiver for transmitting a signal impulse from a certain point and for receiving thereat its echo from an object in the path of the signal impulse such that the echo has a phase characteristic determined by the direction of said object with reference to said point at the time the echo was received, and means for utilizing the phase characteristic of the echo for indicating such direction of said object, means for training personnel in the operation of said system comprising means controlled by the transmission of the signal impulse for supplying to said indicating means a simulated echo having a predetermined phase characteristic representing a known direction of a simulated object with reference to said point whereby an indication of such known direction is obtained.

4. In combination with an echo ranging system comprising means whose direction is adjustable for transmitting a signal impulse and for picking up its echo from an object in the path of the signal such that the echo has a time delay determined by the distance from a certain point to the object and such that the echo has a phase characteristic determined by the direction of the object with reference to the certain point at the time the echo was picked up, and means controlled by such time delay and by such phase characteristic for indicating the distance to the object and the direction of the object respectively, means for training personnel in the operation of said system comprising means controlled by the transmission of a further signal impulse for generating an energy impulse having a time delay determined by a known distance from the certain point to a simulated object and having a phase characteristic determined by a known direction of the simulated object with reference to the certain point, and for applying such energy impulse to said indicating means, when said transmitting means has been adjusted to the direction from which an echo having the time delay and phase characteristic corresponding to that of the energy impulse would be picked up, for indicating under control of the further signal impulse and the simulated echo the known distance and direction of the simulated object, respectively.

5. The combination according to claim 4 in which said generating means includes a train of electronic devices rendered conductive and non-conductive in a certain order, in response to the transmission of the further signal impulse, for supplying the energy impulse to said indicating means a preselected time after the transmission of the further signal impulse and thereby introducing the known time delay in the energy impulse.

6. The combination according to claim 4 in which said generating means includes reactive means for preselecting in the impulse energy a phase characteristic having a sign depending on whether the simulated object lies to the right or left of a line normal to the plane of said transmitting means at a preselected point of such plane, and having a magnitude proportional to the distance that the simulated object lies to the right or left of such line.

7. The combination according to claim 4 in which said generating means includes a plurality of electronic devices rendered conductive and non-conductive in a certain order, in response to the transmission of the further signal impulse, for controlling the effective time during which the energy impulse is applied to said indicating means.

8. In combination with an echo ranging system comprising a directionally adjustable wave translating device for picking up noise waves having a phase characteristic related to the direction from which the noise waves are picked up with reference to a certain point, and means to utilize the phase characteristic of the noise waves for indicating such direction from which the noise waves have been picked up, means for training personnel in the operation of said system comprising means for generating similar noise waves having a preselected phase characteristic representing a known direction of a source simulated by the similar waves with reference to said point, and for applying the similar noise waves to said indicating means, when said device is adjusted to the position from which noise waves having a phase characteristic corresponding to the preselected phase characteristic of the similar noise waves would be picked up, for obtaining an indication of the known direction.

9. The combination according to claim 8 in which said generating means includes reactive means for introducing the preselected phase characteristic in the similar noise waves.

10. A system for training personnel in the operation of an echo ranging apparatus comprising said apparatus including at an observation point a directionally adjustable transreceiver for transmitting signal impulses and for picking up their echoes as reflected by an object in the path of the signal impulses, each echo having with reference to the corresponding signal impulse a time delay proportional to the distance from said transreceiver to the object and having a phase characteristic determined by the angular position of the object with reference to said transreceiver at the time the echo therefrom is picked up at said observation point by said transreceiver, and means for utilizing the time delays and phase characteristics of the echoes for indicating the distances to the object and the directions of the object respectively, means located at said observation point and controlled by the transmission of individual signal impulses for generating a succession of energy impulses having different predetermined time delays proportional to different known distances from said transreceiver to different objects simulated by the energy impulses and having preselected phase characteristics representing known angular positions of the simulated objects with reference to said transreceiver, and means to apply the succession of energy impulses to said indicating means for obtaining, in response to the transmission of the signal impulses and the application of the corresponding energy impulses thereto, a succession of indications of the known distances to and known directions of the different simulated objects.

11. A system for training personnel in the operation of echo ranging apparatus comprising said apparatus including a pair of transreceivers connected together and adjustable in unison in clockwise and counter-clockwise directions for transmitting signal impulses from a certain point and for picking up thereat their echoes reflected from objects in their path, said echoes having with reference to corresponding signal impulses time delays proportional to the distances from said point to the objects and having at a given instant phase differences between the echoes in the pair of transreceivers depending on the right or left direction of the individual objects with reference to a line normal to the plane of said transreceivers at a preselected point, and means controlled by the time delays and phase differences of the echoes for indicating the distances to the objects and the right or left directions thereof respectively, means controlled by the transmission of the signal impulses for generating energy impulses having time delays proportional to known preselected distances from said point to objects simulated by the energy impulses, means for separating each energy impulse into two energy portions having a preselected phase difference therebetween representing known preselected directions of the simulated objects with reference to the normal line to said transreceivers at said point, and circuit means to apply the two energy portions of each energy impulse to said indicating means for obtaining, in response to the transmission of the individual signal impulses and the application of the two energy portions of the corresponding energy impulses thereto, successive indications of the known distances to and angular positions of the simulated objects.

12. The system according to claim 11 in which said separating means comprises means for separating each of the energy impulses into two portions having substantially zero phase difference therebetween for representing simulated objects lying substantially on the normal line to the plane of the transreceivers.

13. The system according to claim 11 in which said separating means comprises means for separating each of the energy impulses into two portions having an effective phase difference of one sign for representing simulated objects lying to the right of the normal line to the plane of the transreceivers, and having an effective phase difference of an opposite sign for representing simulated objects lying to the left of the normal line to the plane of the transreceivers.

14. The system according to claim 11 in which said separating means comprising means for separating each of the energy impulses into two portions having an effective phase difference of a positive sign for representing simulated objects lying on one side of the normal line to the plane of the transreceivers, and having an effective phase difference of a negative sign for representing simulated objects lying on the opposite side of the normal line to the plane of the transreceivers.

References Cited in the file of this patent
UNITED STATES PATENTS

| | | |
|---|---|---|
| 1,939,706 | Karnes | Dec. 19, 1933 |
| 2,321,799 | Cone | June 15, 1943 |